Aug. 19, 1969  A. R. NUGARUS  3,462,085

CIRCULAR NOZZLE

Filed Dec. 1, 1967

INVENTOR
ANTHONY R. NUGARUS

BY
Marshall, Johnston, Cooks & Root
ATTORNEYS

United States Patent Office
3,462,085
Patented Aug. 19, 1969

3,462,085
CIRCULAR NOZZLE
Anthony R. Nugarus, Chicago, Ill., assignor to Crompton & Knowles Corporation, Worcester, Mass., a corporation of Massachusetts
Filed Dec. 1, 1967, Ser. No. 687,169
Int. Cl. B05b 1/06
U.S. Cl. 239—515                6 Claims

ABSTRACT OF THE DISCLOSURE

A circular nozzle for generating a thin conical film of high viscosity material at elevated temperatures for coating articles with a packaging film.

---

This invention relates in general to a coating nozzle for use in packaging articles, and more particularly to a circular nozzle capable of handling a high viscosity coating material at high pressures and temperatures to create a conical film of coating material for application to articles to be packaged by a film of material.

The nozzle of the present invention is particularly useful in a packaging machine to apply a protective, transparent, air-tight film to articles of any particular shape. The material employed for creating the film is liquid and highly viscous at elevated temperatures and solid or hard at normal room temperatures. Articles to be coated may be suitably conveyed through a coating zone established by a stationary coating head, or may be placed on a surface and the nozzle may be moved relatively over the surface to apply a film. The nozzle is constructed to apply an imperforate coating of material of predetermined uniform thickness to articles. In order to establish good transparency of the film, it is important that the thickness of the coating be substantially uniform.

The coating materials employed are commercially referred to as "hot melts," and may be of any suitable type such as wax blends, polyethylenes, cellulosic blends and like materials. These materials are solid or hard at normal temperatures and liquid at elevated temperatures. For example, a coating material when liquid may have a visocsity of from between 100 and 100,000 centipoises at a temperature of between 100 and 500° F. It is contemplated that the material be discharged from the nozzle of the invention at a pressure of from 250 to 5,000 pounds per square inch.

The circular nozzle of the invention is unique in that it can effectively handle the "hot melts" to generate a coating film of substantially uniform thickness. A nozzle body is provided that includes a cylindrical bore defining a cylindrical wall, and a flared skirt portion at the end of the cylindrical wall defining a frusto-conical wall. An inlet is at the end of the body remote from the skirt portion, and feeds to a nozzle spool fitted within the cylindrical bore. A cylindrical wall is defined by the spool that coacts with the cylindrical wall of the bore to define an annular distribution chamber. The coating material is introduced into the distribution chamber at the inlet end through a plurality of circumferentially spaced ports in the spool that are intercommunicated with the inlet by means of a passageway in the spool. A deflecting plate is mounted at the skirt portion, and includes a stepped frusto-conical surface that coacts with the frusto-conical surface of the skirt portion to define an annular distribution chamber and film forming lips.

Accordingly, it is an object of the present invention to provide a circular nozzle for generating a conical coating film for the packaging of articles.

Another object of the present invention is in the provision of a circular nozzle capable of handling coating materials of high viscosity at elevated temperatures and pressures to create a thin conical film for the packaging of articles.

Other objects, features and advantages of the invention will be apparent from the following detailed disclosure, taken in conjunction with the accompanying sheet of drawing, wherein like reference numerals refer to like parts, in which.

Figure 2:
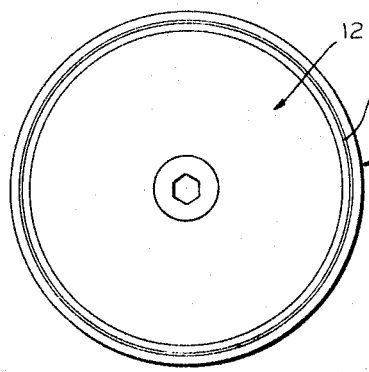
FIG. 2 is a top plan view of the nozzle, taken substantially along line 2—2 of FIG. 1.

Referring now to the drawings, the circular nozzle of the invention includes generally a nozzle body 10, a nozzle spool 11, and a deflecting plate 12 assembled together. Any number of nozzles may be employed in a packaging machine for the coating of articles with a film of packaging material. And it will be understood that the nozzle of the invention is employed for use with coating materials that are highly viscous at elevated temperatures, and where the coating materials are forced through the nozzle at elevated temperatures and pressures.

As already mentioned, the coating materials that may be used with the nozzle of the invention when at elevated temperatures and in liquid form may have a viscosity of between 100 to 100,000 centipoises when operating at a temperature of 100 to 500° F., and under a pressure of 250 to 5,000 pounds per square inch. These coating materials may be transparent or opaque, and are preferably non-exuding, non-toxic, and highly cohesive in nature. The materials when hardening or solidifying on an article are preferably of a type that may be easily removed and/or stripped from an article, while also possessing a high degree of flexibility or pliability while being relatively tough and hard at room temperatures. Such coatings, as above mentioned, are defined as "hot melt" coatings, and may actually constitute wax blends, polyethylenes, cellulosic blends and like materials.

Figure 1:
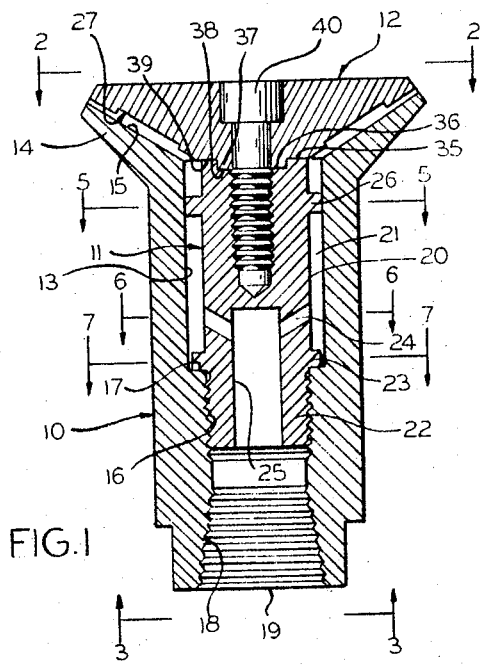
FIG. 1 is an axial sectional view taken through the circular nozzle of the present invention.
Figure 5:
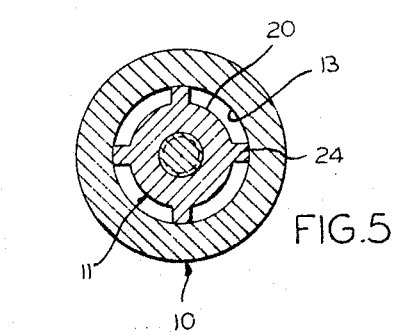
FIG. 5 is a transverse sectional view of the nozzle of FIG. 1, taken substantially along line 5—5.
Figure 6:
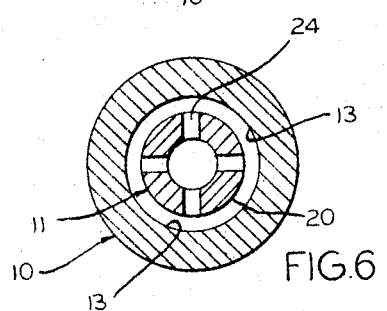
FIG. 6 is a transverse sectional view of the nozzle taken substantially along line 6—6 of FIG. 1.
Figure 7:
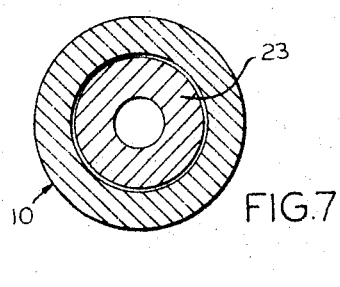
FIG. 7 is a transverse sectional view taken through the nozzle and substantially along line 7—7 of FIG. 1.
Figure 3:
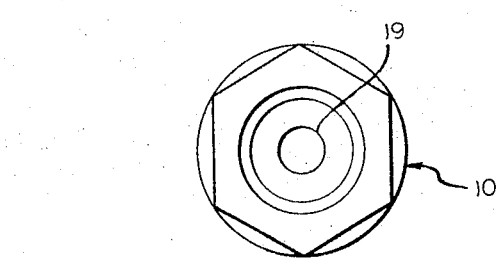
FIG. 3 is a bottom plan view of the nozzle taken substantially along line 3—3 of FIG. 1.

The nozzle body 10 includes a cylindrical bore defining a cylindrical wall 13, a flared skirt portion 14 defining a frusto-conical wall 15 that extends from the outer or discharge end of the cylindrical wall 13. As seen in FIG. 1, a threaded bore 16 is arranged below the cylindrical wall 13 and of a smaller diameter, thereby defining an annular shoulder 17 at the lower end of the wall 13. The threaded bore 16 opens downwardly into a pipe tapped bore 18 that defines the inlet 19 and provides for attachment of the nozzle to a suitable pipe or conduit leading to a source of coating material under high pressure and conditioned to an elevated temperature. While the nozzle is shown in FIG. 1 with the inlet end down and the outlet end up, this facilitates description of the nozzle, and it will be understood that the outlet end of the nozzle will normally be facing downwardly when in use.

The nozzle spool 11 includes an outer cylindrical wall 20 that is smaller in dimension than the body cylindrical wall 13 and therefore defines therewith an annular material distribution chamber 21. The lower end of the nozzle spool 11 includes a threaded portion 22 to be received in the threaded bore 16 of the body for securing the nozzle spool to the body, and a radial flange 23 that coacts with and abuts against the shoulder 17 to precisely position the spool within the body so that when the deflecting plate 12 is thereafter secured to the spool, it will be precisely positioned relative to the frusto-conical wall 15.

A plurality of ports 24 are formed in the spool 11. These ports intercommunicate with an axially extending passageway 25 formed in the spool, which in turn, communicates with the inlet 19 of the nozzle body. While any number of ports 24 may be provided, the present embodiment illustrates four that are circumferentially, equally spaced in order to provide even distribution of the coating material throughout the distribution chamber 21. In order to further facilitate the flow of coating material from the passageway 25 into the distribution chamber 21, the ports 24 are arranged along an axis that directs the flow against the body cylindrical wall 13 and at an angle toward the discharge end of the distribution chamber 21. Thus, the arrangement of the ports is such as to give directional movement of the material toward the discharge end of the nozzle and to provide equal distribution of the material throughout the distribution chamber, which in turn further distributes the material equally around the annular distribution chamber.

A plurality of radially extending diffusers or projections 26 extend from the cylindrical wall 20 of the spool adjacent the outlet end of the distribution chamber 21 and serve to reduce the turbulence of the coating material as it passes through the distribution chamber. While these diffusers are shown four in number, it should be appreciated that any suitable number may be provided, and further the diffusers may extend at an angle other than normal to the cylindrical wall 20 of the spool.

The deflecting plate 12 includes a stepped frusto-conical wall 27 that is positioned opposite the frusto-conical wall 15 of the nozzle body. The stepped frusto-conical wall 27 includes at its lower end an inlet wall section 28. A lip or film forming wall section 29 is provided at the upper end of the wall 27, and a distribution chamber wall section 30 is provided intermediate the sections 28 and 29. Each of the wall sections is parallel to the frusto-conical wall 15 of the body, and the section 28 forms with the wall 15 an annular inlet chamber 31, while the section 30 forms with the wall 15 an annular distribution chamber 32, and the section 29 forms with the wall 15 an annular film generating chamber 33. Each chamber is effectively frusto-conical in shape. The terminal end of the skirt portion 14 and the terminal end of the deflecting plate 12 are flush or aligned to provide the film forming discharge orifice 34. The lower end of the wall section 28 is aligned with a plane extending perpendicular to the ends of the cylindrical walls 13 and 20. Thus, the upper end face 35 of the nozzle spool 11 terminates in alignment with the upper end of the cylindrical wall 13 when the spool is bottomed in the nozzle body. A counterbore 36 is also provided in the end face 35 of the spool.

Thus, it can be appreciated that it is necessary to precisely position or orient the deflecting plate 12 on the nozzle spool 11 so that the stepped frusto-conical wall 27 that coacts with the frusto-conical wall 15 of the body is precisely positioned relative thereto. The lower end of the deflecting plate 12 includes a cylindrical section 37 having an end face 38, and an annular shoulder 39, all of which mate and coact with the end face 35 and counterbore 36 of the spool to precisely position the deflecting plate 12 relative to the spool and nozzle body. A suitable tapped bore is provided in the nozzle spool, together with a stepped hole in the deflector plate to receive a suitable cap screw 40 that secures the deflector plate 12 in place on the nozzle spool and body.

Figure 4:
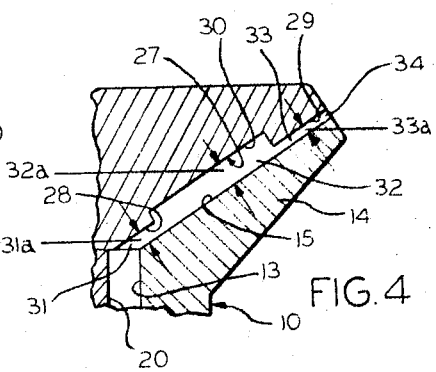
FIG. 4 is an enlarged fragmentary sectional view of the nozzle of FIG. 1 taken through the deflecting plate.

As seen particularly in FIG. 4, the widths of the chambers 31, 32 and 33 vary and are indicated by the arrows and lead lines 31a, 32a and 33a, wherein the width of the chamber 33 is less than the width of the chamber 31, while the width of the chamber 32 is greater than the width of the chamber 31. One or more shims may be arranged between the end face 25 and the shoulder 39 to vary the widths of the chamber defined by the deflecting plate 12 in order to handle varying operating conditions.

In operation, a coating material is delivered under pressure and elevated temperature to the inlet 19 of the nozzle. Flow extends through the passageway 25 and out through the ports 24 into the distribution chamber 21. The distribution chamber 21 will then fill or load, whereby the material will enter the inlet chamber 31. From the inlet chamber, the material will flow into the distribution chamber 32 which will further enhance the distribution uniformly in the nozzle head before delivering the material to the film generating or forming chamber 33. A uniform thickness film will then be discharged from the orifice 34 in a conical shape for application to articles for packaging of same.

The invention is hereby claimed as follows:

1. A nozzle for forming a conically shaped film of highly vicous material which is liquid at elevated temperatures and solid at room temperatures, said nozzle comprising a body having a cylindrical bore defining a cylindrical wall therein and a flared skirt at one end open to the bore defining a frusto-conical wall extending from one end of said cylindrical wall, an inlet at the end of the nozzle remote from said flared skirt, a nozzle spool fitted within said bore and having a cylindrical wall coacting with the cylindrical wall of the bore to define an annular distribution chamber, a plurality of circumferentially spaced ports in said spool opening to the distribution chamber, a passageway in said spool intercommunicating the inlet and said ports, and a frusto-conically shaped deflecting plate secured to said nozzle spool and having a stepped frusto-conical wall coacting with said frusto-conical wall of said body to define a further distribtuion chamber and film forming lips at the outer ends.

2. A nozzle as defined in claim 1, wherein said ports are adjacent the inlet end of the spool distribution chamber and extend at an angle to the spool axis to direct the flow of material against the bore cylindrical wall and towards the outlet end of the spool distribution chamber.

3. A nozzle as defined in claim 1, and diffusers on said spool adjacent the outlet end of the distribution chamber to reduce turbulence in said chamber.

4. A nozzle as defined in claim 3, wherein said diffusers extend radially and are equally spaced apart.

5. A nozzle as defined in claim 1, wherein said stepped frusto-conical wall of the deflecting plate defines an annular inlet orifice at the outlet of the spool distribution chamber, an annular film forming orifice at the outlet end of said reflecting plate of a width smaller than said inlet orifice, and an intermediate annular distribution chamber of a width greater than said inlet orifice.

6. A nozzle as defined in claim 2, diffusers on said spool adjacent the outlet end of the distribution chamber to reduce turbulence in said chamber, said diffusers extend radially and are equally spaced apart, and said stepped frusto-conical wall of the deflecting plate defines an annular inlet orifice at the outlet of the spool distribution chamber, an annular film forming orifice at the outlet end of said deflecting plate of a width smaller than said inlet orifice, and an intermediate annular distribution chamber of a width greater than said inlet orifice.

References Cited

UNITED STATES PATENTS

| 1,628,041 | 5/1927 | Frye. | |
| 1,688,827 | 10/1928 | Nelson | 239—524 |
| 2,571,763 | 10/1951 | Robbins. | |
| 2,935,266 | 5/1960 | Coleondro et al. | |
| 3,207,446 | 9/1965 | Dyck | 239—515 |

EVERETT W. KIRBY, Primary Examiner

U.S. Cl. X.R.

239—524, 590, 601